(12) United States Patent
Davies

(10) Patent No.: US 8,381,846 B2
(45) Date of Patent: Feb. 26, 2013

(54) ALL TERRAIN VEHICLE POWER TAKEOFF

(76) Inventor: Jeffrey D. Davies, Seattle, WA (US)

(*) Notice: Subject to any disclaimer, the term of this patent is extended or adjusted under 35 U.S.C. 154(b) by 0 days.

(21) Appl. No.: 10/735,950

(22) Filed: Dec. 14, 2003

(65) Prior Publication Data

US 2005/0126834 A1 Jun. 16, 2005

(51) Int. Cl.
*B60K 17/28* (2006.01)
*B60K 25/00* (2006.01)
(52) U.S. Cl. .......... 180/53.1; 180/53.4; 74/15.6
(58) Field of Classification Search .......... 180/53.1, 180/53.4; 74/11, 13, 15.6, 15.82
See application file for complete search history.

(56) References Cited

U.S. PATENT DOCUMENTS

| | | | | |
|---|---|---|---|---|
| 4,051,915 A * | 10/1977 | Behrens | ............ | 180/271 |
| 4,577,712 A * | 3/1986 | Foote et al. | ............ | 180/53.4 |
| 4,658,662 A * | 4/1987 | Rundle | ............ | 74/331 |
| 4,703,818 A * | 11/1987 | Adams | ............ | 180/53.6 |
| 5,070,982 A * | 12/1991 | Pitchford | ............ | 192/69.9 |
| 5,144,852 A * | 9/1992 | Yokoyama | ............ | 74/473.36 |
| 5,247,845 A * | 9/1993 | Grayson | ............ | 74/11 |
| 5,248,001 A * | 9/1993 | Moseley | ............ | 173/1 |
| 5,427,192 A * | 6/1995 | Stephenson et al. | ............ | 180/53.1 |
| 5,947,218 A * | 9/1999 | Ishimaru | ............ | 180/53.1 |
| 6,179,745 B1 * | 1/2001 | Beam et al. | ............ | 477/166 |
| 6,182,784 B1 | 2/2001 | Pestotnik | | |
| 6,499,548 B2 * | 12/2002 | Wesley | ............ | 180/53.1 |
| 6,533,695 B2 | 3/2003 | Pollman | | |
| 6,672,414 B2 * | 1/2004 | Laflamme | ............ | 180/53.4 |
| 6,719,637 B1 * | 4/2004 | Greene | ............ | 464/182 |
| 2002/0094902 A1 | 7/2002 | Pollman | | |
| 2002/0183155 A1 | 12/2002 | Pollman | | |
| 2003/0070848 A1 * | 4/2003 | Hasegawa et al. | ............ | 180/53.1 |
| 2005/0126319 A1 * | 6/2005 | Jones | ............ | 74/11 |

* cited by examiner

*Primary Examiner* — Paul N Dickson
*Assistant Examiner* — George Spisich
(74) *Attorney, Agent, or Firm* — Peloquin, PLLC; Mark S. Peloquin, Esq.

(57) ABSTRACT

A method includes adapting an all-terrain-vehicle transmission (ATV) shaft for coupling thereto. The method includes configuring an ATV transmission cover to allow the ATV transmission shaft to pass through the ATV cover, and modifying an ATV sub-transmission shift plate to provide a neutral position for the transmission, wherein the neutral position disconnects power to ATV wheels while providing power to the ATV transmission shaft. An apparatus includes an ATV transmission, having a transmission shaft and transmission housing, wherein the transmission shaft is configured to facilitate coupling thereto; and a transmission shaft extension releaseably connectable with the transmission shaft, the transmission housing having an opening through which the transmission shaft extension can be accessed such that energy can be transferred to an external device.

3 Claims, 14 Drawing Sheets

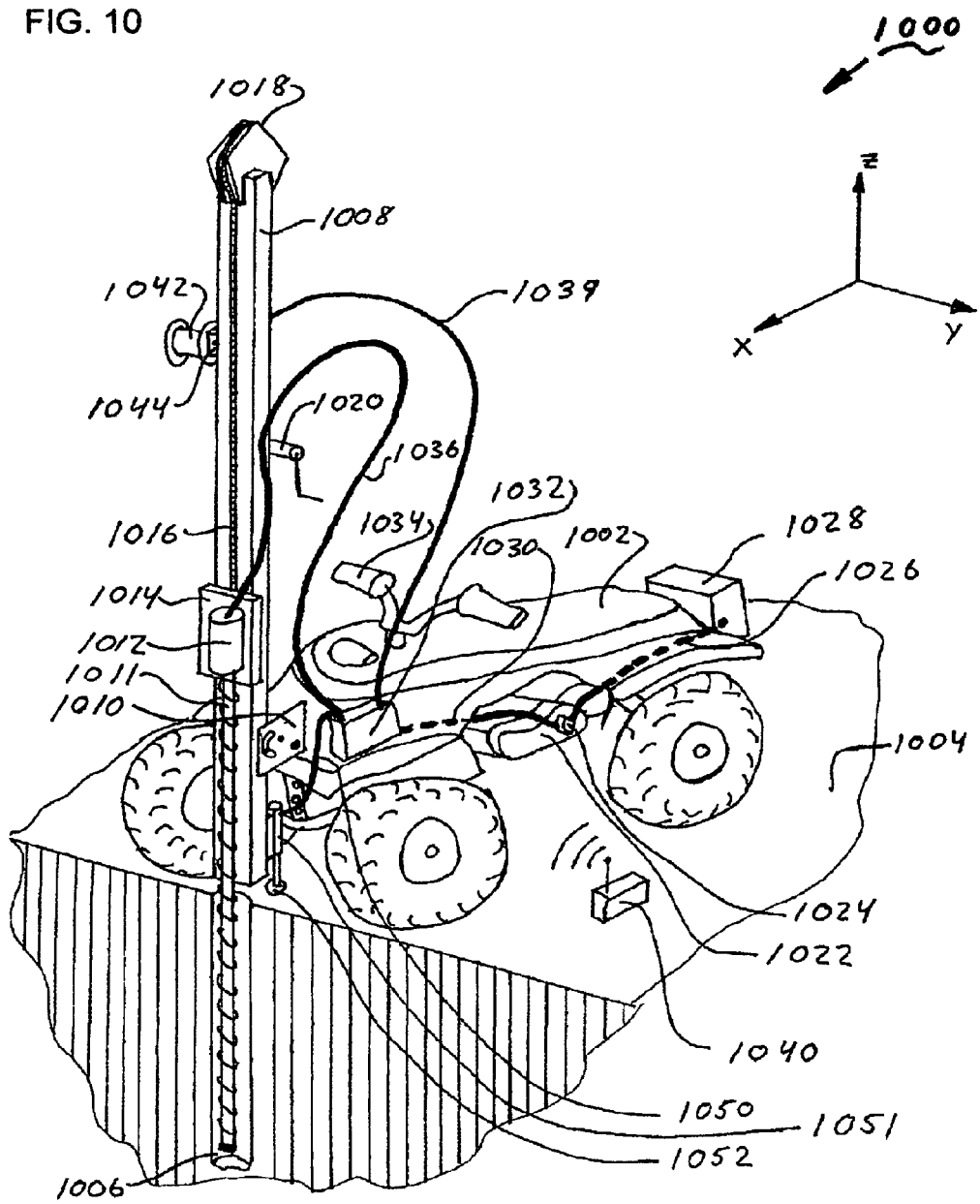

ALL TERRAIN VEHICLE POWER TAKEOFF

RELATED APPLICATIONS

Commonly assigned U.S. patent application entitled "ALL TERRAIN VEHICLE POWERED MOBILE DRILL," filed on the same day as this application, application Ser. No. 10/735,946.

FIELD OF INVENTION

The invention relates generally to all terrain vehicles (ATV), and more specifically to a power takeoff adapted to an ATV and mechanical accessories that can be powered by the power takeoff such as a mobile drill.

ART BACKGROUND

An all terrain vehicle (ATV) contains a motor, a frame, and wheels which combine to provide a vehicle that is capable of conveying an operator over varied and difficult terrain. Such a vehicle has been employed for various uses; some uses are but are not limited to, delivering hunters into a hunting area, delivering ice fishermen onto a lake, etc. Additionally, the ATV has been used as a platform to mount devices thereon, wherein the device contains an auxiliary power source, such as a lawn mowing attachment powered by a motor separate from the motor of the ATV.

What is needed are methods and apparatuses for extracting power from the ATV engine without the need to include a separate power source for the attachment.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 10 shows a mobile drill powered by an all terrain vehicle power takeoff according to one embodiment of the invention.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of ordinary skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Apparatuses and methods are described to provide a power takeoff for an all terrain vehicle (ATV) transmission. The power takeoff has general application to power various devices with power supplied from the ATV engine. A mobile drill is disclosed that derives power from an ATV power takeoff to power the drill and various accessories.

Figure 1:
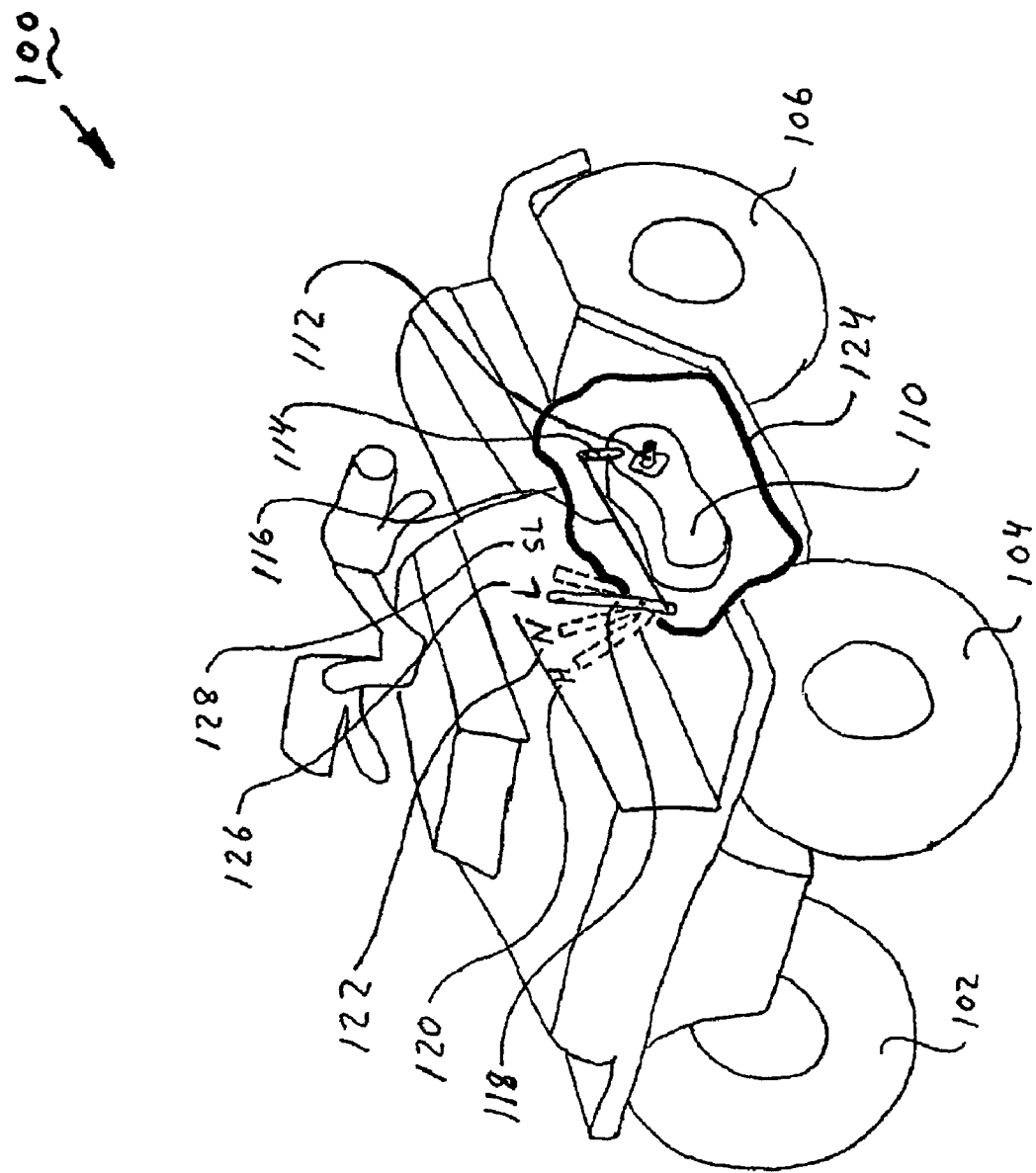
FIG. 1 illustrates one embodiment of an all terrain vehicle adapted for use with a power takeoff.

FIG. 1 illustrates one embodiment of an all terrain vehicle (ATV) adapted for use with a power takeoff. With reference to FIG. 1, an ATV is shown generally at 100. ATV 100 includes wheels 102, 104, 106, and a fourth wheel (not shown). A cutaway view of the ATV body reveals the transmission 110. Transmission 110 is generally composed of a main transmission and a sub-transmission. Power is extracted form the ATV engine by means of a power takeoff. A point from which to extract power is indicated by shaft 112. Shaft 112 is capable of rotating and thereby supplying power to a mechanism coupled with shaft 112.

When operating a device coupled with the shaft 112, it can be advantageous, though not required, to place the transmission in a neutral position; thereby, eliminating the application of power to the wheels 102, 104, and 106. In one embodiment, the transmission or sub-transmission of the all terrain vehicle can be shifted among a plurality of gears by the rotation of a rod (not shown) attached to a shift lever 114, as viewed through a cutaway 124. Shift lever 114 is connected by element 116 to a shift control lever 118. Shift control lever 118 has a plurality of positions as shown within FIG. 1. High gear is indicated by the "H" as shown at 120, a neutral position is indicated by "N" at 122, a low gear position is indicated by "L" at 126, and a super low gear position is indicated by "SL" at 128. An operator (not shown) can move the shift control lever 118 to the positions as desired according to the various modes in which the ATV can be used with the power takeoff.

Figure 2:
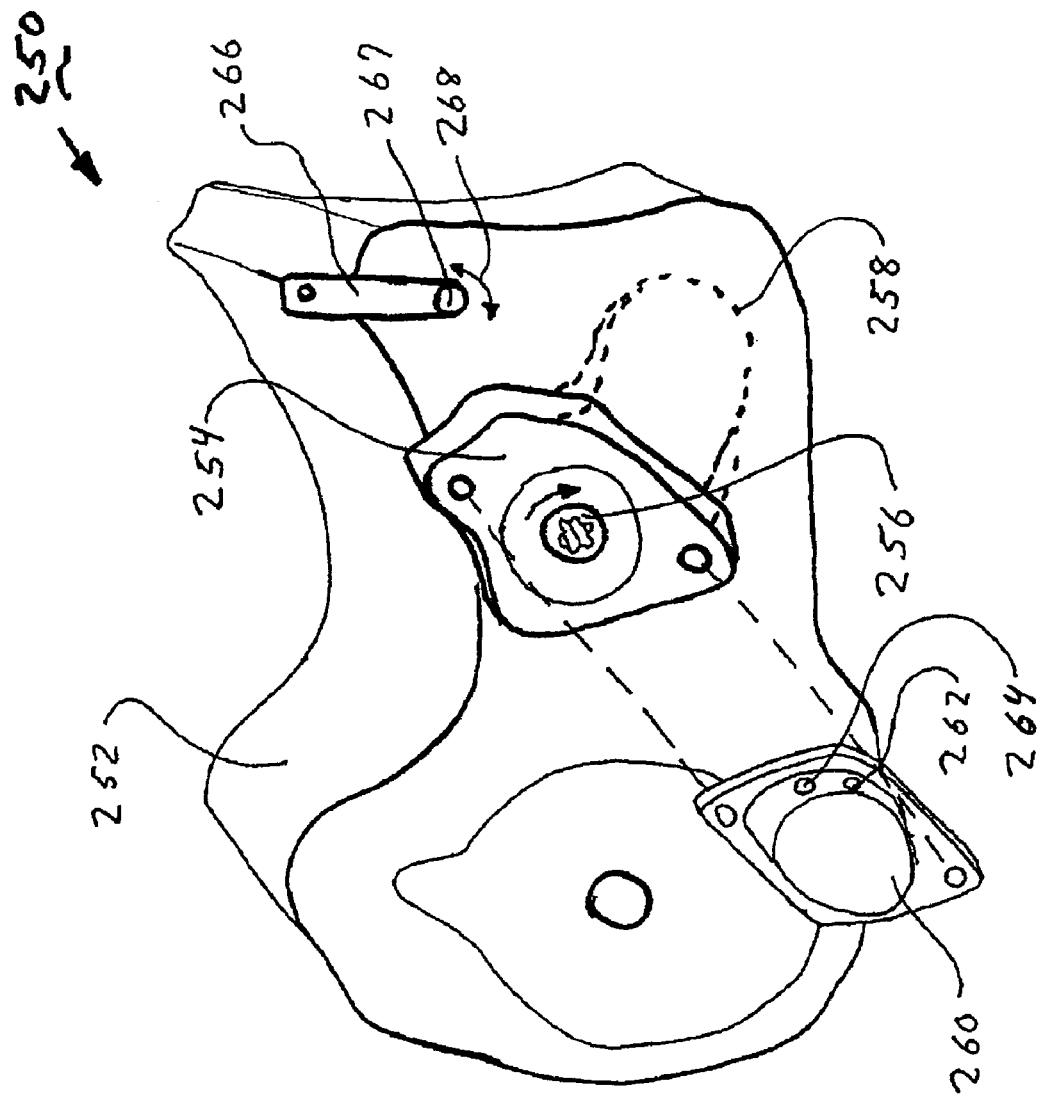
FIG. 2 shows one embodiment of an all terrain vehicle transmission with a power takeoff.

FIG. 2 shows one embodiment of an all terrain vehicle transmission including a power takeoff. With reference to FIG. 2, an ATV transmission is shown generally at 250. Transmission 250 has an outer case 252 which can house, in one or more embodiments, a sub-transmission. Typically, an ATV has a main transmission which allows an operator to shift between a plurality of gears. The ATV can also have a sub-transmission, which allows further shifting between a second plurality of gears, wherein the second plurality of gears affords a lower range of gearing than does the plurality of gears in the main transmission. A transmission or sub-transmission shift lever is indicated at 266. The shift lever 266 causes rotation of shaft 267 as indicated by arrow 268. Movement of shift lever 266 places the ATV transmission or sub-transmission in one of a plurality of gears as described in conjunction with FIG. 1 above.

A transmission shaft 256 is configured with coupling means such as the spline shown in FIG. 2. Other coupling means can be provided on the shaft 256, such as but not limited to a slotted end, a square end, a keyed location, etc. Additionally, various mechanical devices can be coupled to the shaft 256, such as a sheave, a sprocket, etc.; thereby, providing a means for moving the source of the power derived from the ATV engine (a further discussion of this topic is provided below in conjunction with FIG. 7). In one embodiment, the power takeoff point can include a flange 254. Flange 254 can be configured with support 258 as may be required in certain applications. For example, if an existing transmission case is being retrofitted with a flange, a flange support 258 can be provided to keep the stresses applied to the transmission case 252 within allowable levels during operation of devices attached to the power takeoff.

In one embodiment, the flange 254 can receive a device 260. Device 260 can be, in one embodiment, a hydraulic pump with intake and output ports 262 and 264, into which, fluid is received and then output under pressure. In another embodiment, device 260 can be a generator or alternator; thereby, creating an electrical potential which can be used to power an electric motor or provide another function, such as, a power source for an arc welder.

Figure 3:
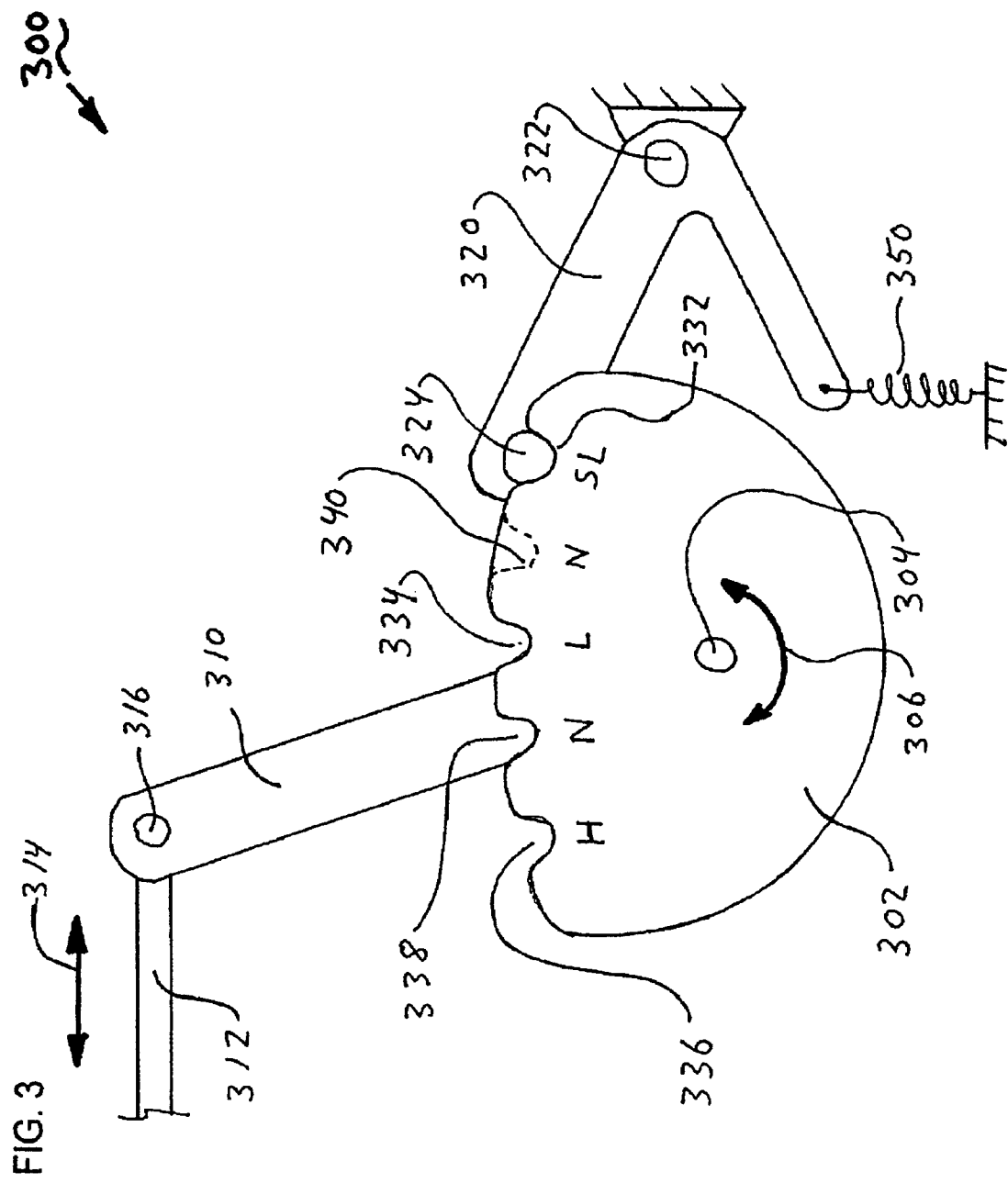
FIG. 3 illustrates a sub-transmission shift assembly adapted to provide a neutral position according to one embodiment of the invention.

FIG. 3 illustrates a sub-transmission shift assembly adapted to provide a neutral position according to one embodiment of the invention. With reference to FIG. 3, a shift plate 302 is attached to a shift rod 304. Shift rod 304 is supported by bearings (not shown); shift rod 304 is configured to rotate about an axis perpendicular to the plane of the figure as indicated by an arrow 306. A shift lever 310 is fixedly attached to the shift plate 302. A member 312 is rotateably attached to the shift lever 310 at connection 316. Shift plate 302 is fixedly attached to shift rod 304. Movement of the member 312 in the direction of arrow 314 results in rotation of the shift plate 302 (and the shift rod 304) about the longitudinal axis of the shift rod 304. Various rotational positions of the shift plate correspond to placing the transmission in various gears. It will be recognized by those of ordinary skill in the art that member 312 can be replaced with other means for moving shift lever 310, such as but not limited to a flexible cable, a chain and sprocket assembly, etc. The present invention is not limited by the way in which the shift rod is placed in a neutral position.

A detent mechanism keeps the shift rod 304 oriented at a fixed position. The detent mechanism includes an arm 320 configured to rotate about pivot point 322. A force is generated by a pre-stressed member 350. The pre-stressed member 350 can be a spring which applies a force to the arm 320 which induces rotation of the arm 320 in a counterclockwise direction. The arm 320 has a lobe 324 that engages with a notch in the shift plate 302. In one embodiment, that can correspond to a sub-transmission used in an Artic Cat 250 or 300 ATV, Suzuki LT-F4WDX, LT-F4WD, models 250, 300, King Quad, etc. ATV as shown in FIG. 3, the detent mechanism keeps the transmission in a "super low" position as indicated at 332 with annotation SL. Other notches corresponding to a gear position for "low" at 334 with annotation L and a gear position for "high" at 336 with annotation H are indicated on the shift plate 302.

In one embodiment, the stock shift plate in the Artic Cat and Suzuki transmissions mentioned above can be adapted to include a notch 338 which places the sub-transmission in neutral. Placing the sub-transmission in neutral deprives power from the wheels of the ATV which may be useful in some applications of a power takeoff unit. The notch 338 is located midway between the notch for "high" at 336 and the notch for "low" indicated at 334. Another position of the shift rod 304 that corresponds to neutral can be found by placing a notch at location 340. Location 340 is between the notch for "low" 334 and the notch for "super low" 324.

Figure 4A:
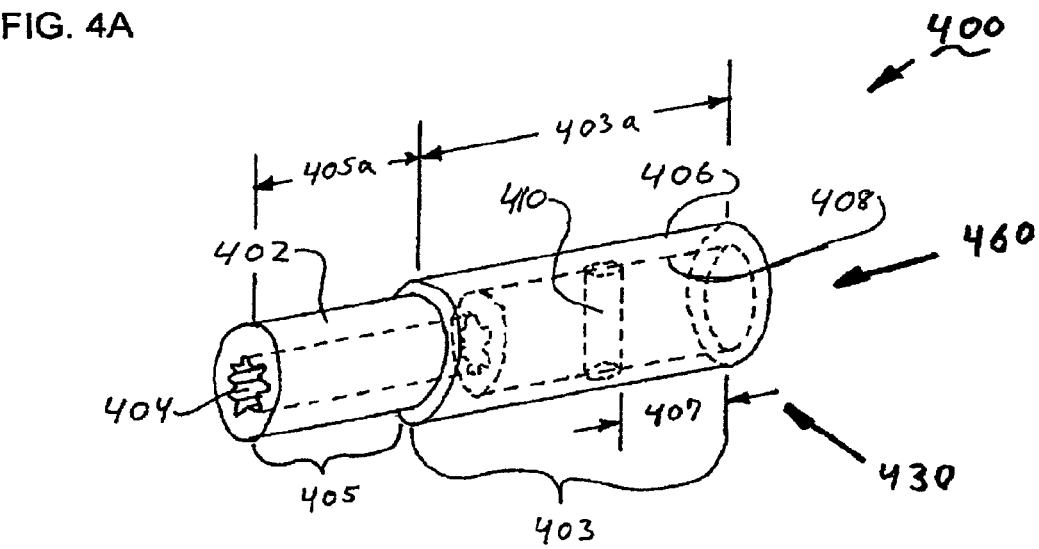
FIG. 4A depicts an all terrain vehicle transmission shaft extension according to one embodiment of the invention.

FIG. 4A depicts an all terrain vehicle (ATV) transmission shaft extension according to one embodiment of the invention. An isometric view of the transmission shaft extension is shown generally at 400. Some transmissions require the transmission shaft to be modified to provide a means for coupling to the transmission shaft in order to extract power from the engine via the transmission shaft. According to one embodiment, a transmission shaft is modified to accept a transmission shaft extension, such as the transmission shaft extension 400. Transmission shaft extension 400 has a cylindrical first part 403 having an outer surface 406 and an inner surface 408. Both the outer surface 406 and the inner surface 408 are characterized by respective diameters. Transmission shaft extension 400 has a second part 405 having an outer surface 402. Outer surface 402 has an outer diameter and a splined inner surface indicated by 404. A cylinder 410 is located as shown within the first portion. The cylinder 410 is one embodiment of a coupling structure that permits joining two shafts together. Other coupling structures can be used; examples include, but are not limited to, a threaded region of either the inner or outer surface, locking rings, an axial interlock mechanism, etc.

Figure 4B:
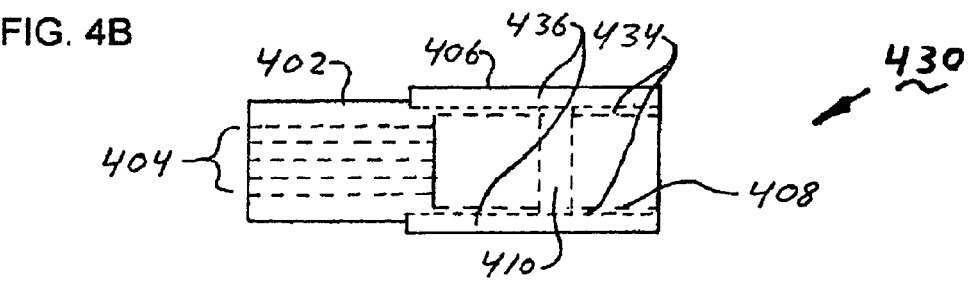
FIG. 4B shows a cross-sectional view of the all terrain vehicle transmission shaft extension illustrated in FIG. 4A.

FIG. 4B shows a cross-sectional view at 430 of the all terrain vehicle transmission shaft extension illustrated in FIG. 4A. In one embodiment, the first part 403 can be formed from a composite of two concentric cylindrical parts such as 436 and 434. In one embodiment, inner cylindrical part 434 extends along the entire length of the first part and the second part. The inner part can be drilled to receive the rod 410. Rod 410 can be press fit into the inner cylindrical part 434. In one embodiment the outer diameter of rod 410 is 0.375 inches.

In one embodiment, selected for use with an Artic Cat 250 or 300 ATV sub-transmission or a sub-transmission used in a Suzuki LT-F4WDX, LT-F4WD (e.g., 250, 300 & King Quad), the inner cylindrical part 434 can be machined from a spline made by Spencer, Inc. model number "SP 738-20-11 S-32." The outer diameter of the second part 402 is 0.785 inch. In one embodiment, the outer cylindrical part 436 is made from the inner race of a bearing made by Torrington, Inc., part number "IR-182216 MS-51962-12." The outer diameter of the outer cylindrical part 406 measures 1.374 inch. The longitudinal extent of the second part, as indicated by 405a, is 0.659 inch and the longitudinal extent of the first part, as indicated by 403a, is 1.008 inch. In one embodiment, rod 410 is set back 0.246 inch from the edge of the outer cylindrical part as indicated at 407.

Figure 4C:
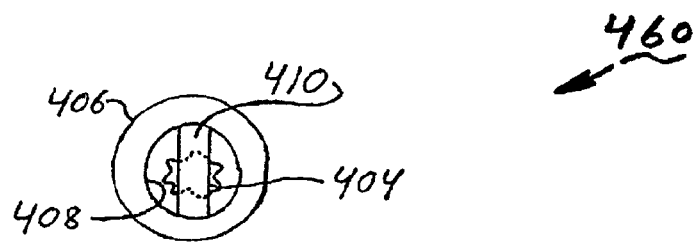
FIG. 4C shows an end view of the all terrain vehicle transmission shaft extension illustrated in FIG. 4A.

FIG. 4C shows an end view, generally at 460, of the all terrain vehicle (ATV) transmission shaft extension illustrated in FIG. 4A. With reference to FIG. 4C, the rod 410 is visible along with the inner surface 408 and outer surface 406 of the first cylindrical part, and the spline surface 404.

Figure 4D:
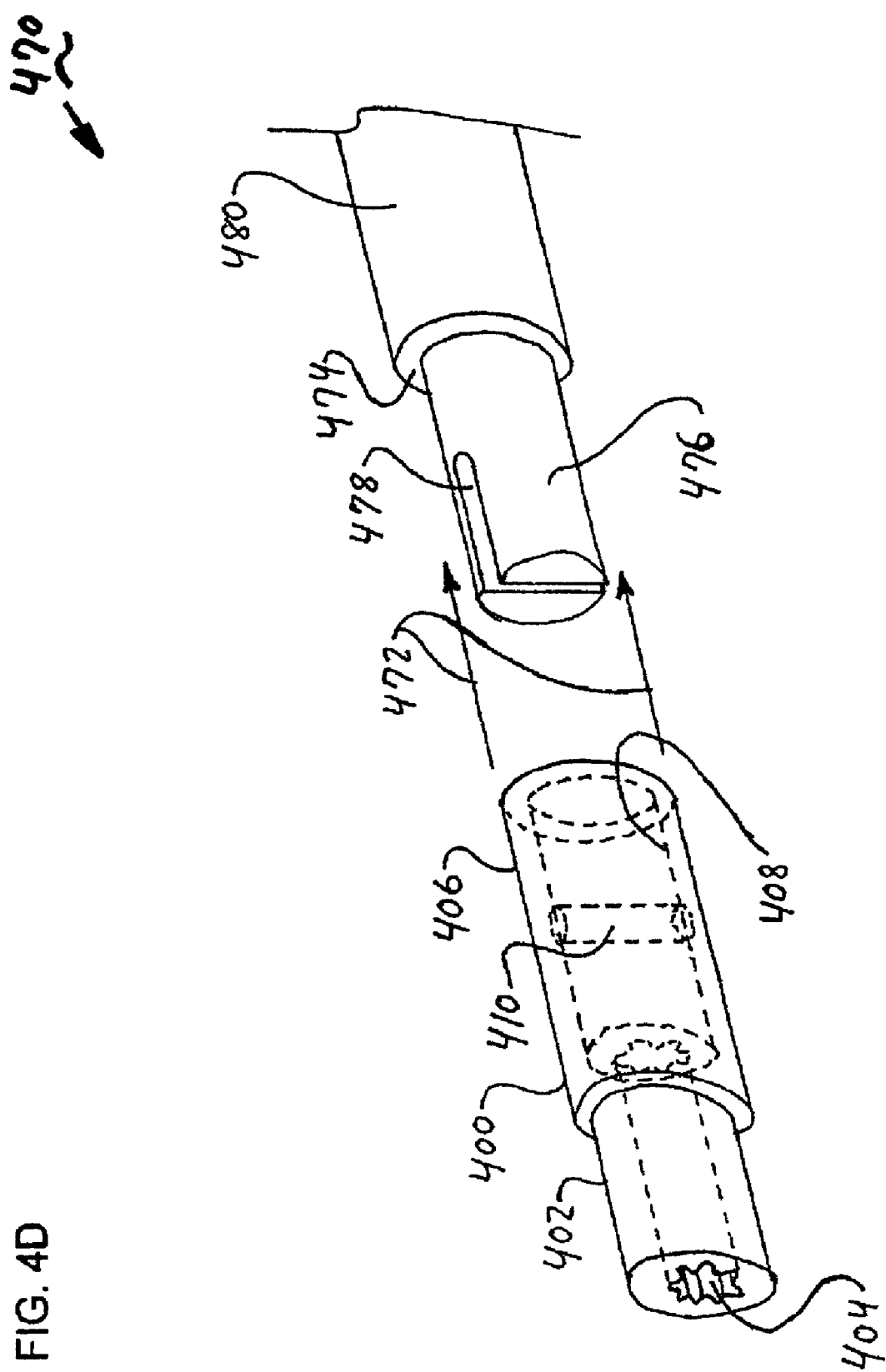
FIG. 4D illustrates an exploded view of an all terrain vehicle transmission shaft extension and the transmission shaft according to one embodiment of the invention.

FIG. 4D illustrates, generally at 470, an exploded view of an all terrain vehicle (ATV) transmission shaft extension and the transmission shaft according to one embodiment of the invention. With reference to FIG. 4D, in one embodiment, transmission shaft 480 can be an Artic Cat 250 or 300 ATV transmission shaft or a Suzuki LT-F4WDX, LT-F4WD (e.g., 250, 300 & King Quad) ATV transmission shaft. Transmission shaft 480 has an end portion 476 and a shoulder 474. In one embodiment, a slot 478 can be ground into the end portion 476 of transmission shaft 480. After the slot 478 has been formed, the transmission shaft extension 400 can be mated with the transmission shaft 480 by moving the transmission shaft extension 400 in the direction indicated by arrows 472.

With respect to the transmissions mentioned above, the slot 478 can be ground according to various methods. According to one method, the transmission shaft 480 can be ground while installed in the ATV transmission. A transmission case cover can be removed exposing the transmission shaft; thereby, allowing the end portion 476 to be ground with a slot. In another method, the transmission shaft 480 can be removed from the transmission; thereby, allowing the shaft to be inserted into a milling machine, for example, while the slot 478 is formed.

It will be recognized by those of ordinary skill in the art that other coupling techniques can be employed to create an extension for transmission shaft 480 within other embodiments of the invention. For example, shapes other than rods and slots such as 478 and 410 can be employed for coupling. The end portion 476 and the mating portion 408 can be configured with splines, threads, square cross-sections, etc., allowing the parts to mate; thereby, extending the effective length of the transmission shaft 480.

Figure 5:
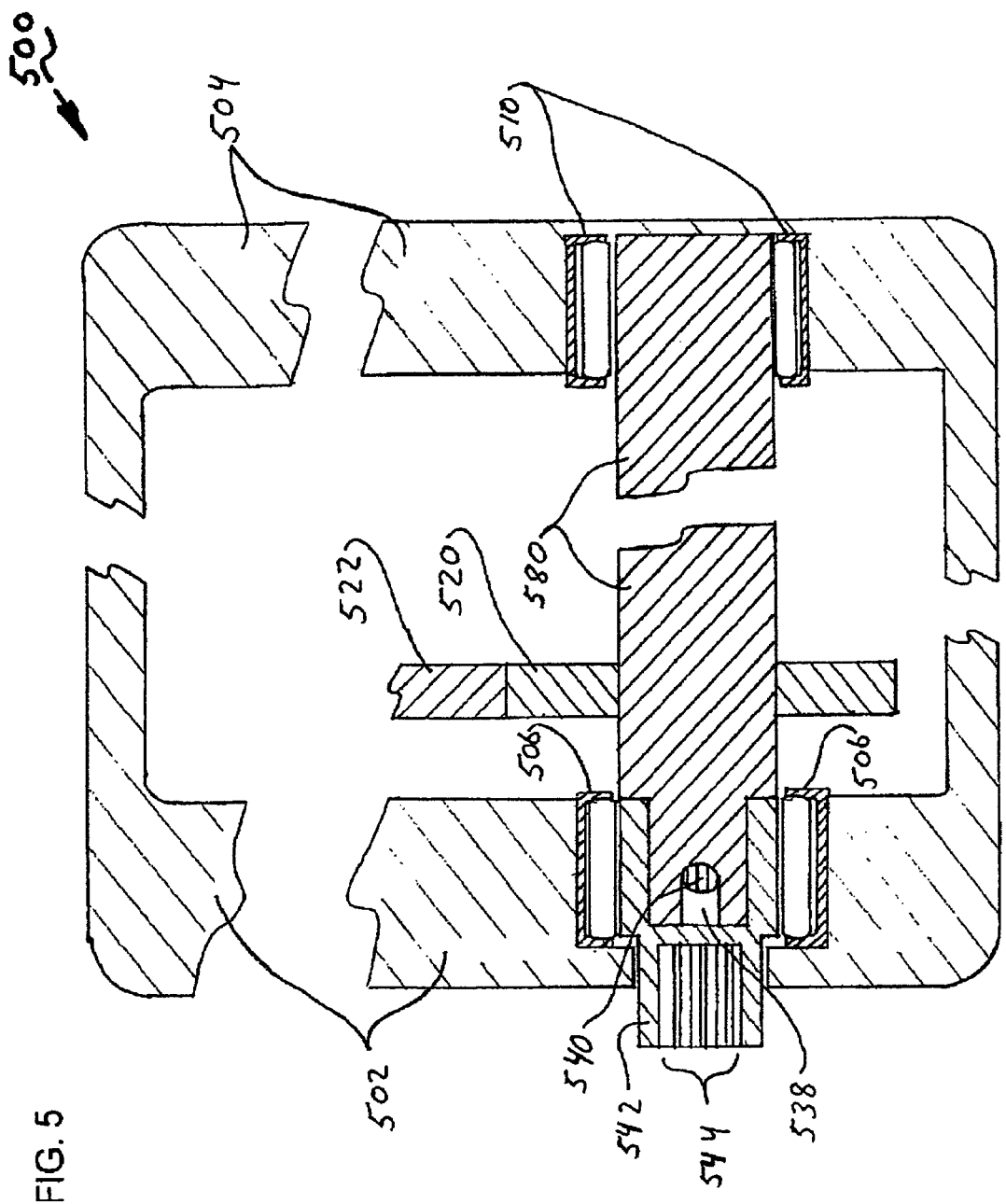
FIG. 5 illustrates an all terrain vehicle power takeoff according to one embodiment of the invention utilizing an all terrain vehicle transmission shaft extension.

FIG. 5 illustrates an all terrain vehicle (ATV) power takeoff according to one embodiment of the invention utilizing an all terrain vehicle transmission shaft extension. With reference to FIG. 5, an ATV transmission is indicated generally at 500. Typically, an ATV transmission is configured with a primary transmission and a sub-transmission, as described above. A transmission case, which may include the sub-transmission, has a left portion 502 and a right portion 504. The transmission shaft 580 has a plurality of gears mounted thereon (not all are shown), such as a gear 520. The gear 520 mates with a gear 522 as well as other gears (not shown) to provide the required transmission functionality. Only the pertinent portions of the transmission and/or sub-transmission are shown to preserve clarity during this description. In one embodiment, a transmission shaft extension 542 is configured with the transmission shaft 580 utilizing a slot 538 which mates with a rod 540 to provide an extension to the transmission shaft. The extension provides a means for coupling via the splines 544 to the transmission shaft extension. In one embodiment, the transmission shaft 580 and the transmission shaft extension can be prepared as described in conjunction with FIG. 4A, FIG. 4B, FIG. 4C, and FIG. 4D.

In one embodiment, directed to providing a power takeoff in an Artic Cat 250 or 300 ATV transmission or a Suzuki LT-F4WDX, LT-F4WD (e.g., 250, 300 & King Quad) transmission, bearing 506 is a bearing from Torrington, Inc. model number "HJ-223016 MS-51961-18." The original stock bearing can be removed and replaced with the bearing mentioned above. It will be recognized by those of ordinary skill in the art that other configurations of transmission shaft extension 542 are possible utilizing other bearings and shaft geometry. The present invention is not limited to one bearing and shaft diameter. The transmission shaft 580 is supported in at least one other place by bearing 510, shown in the opposite side of the transmission case.

In one or more embodiments, it may be necessary to provide a hole within the transmission case 502 to allow the transmission shaft extension 542 to pass through. It will be noted by those of ordinary skill in the art that a hole can be formed in the transmission case 502 by various means, such as, but not limited to, drilling, milling, grinding, etc.

Figure 6:
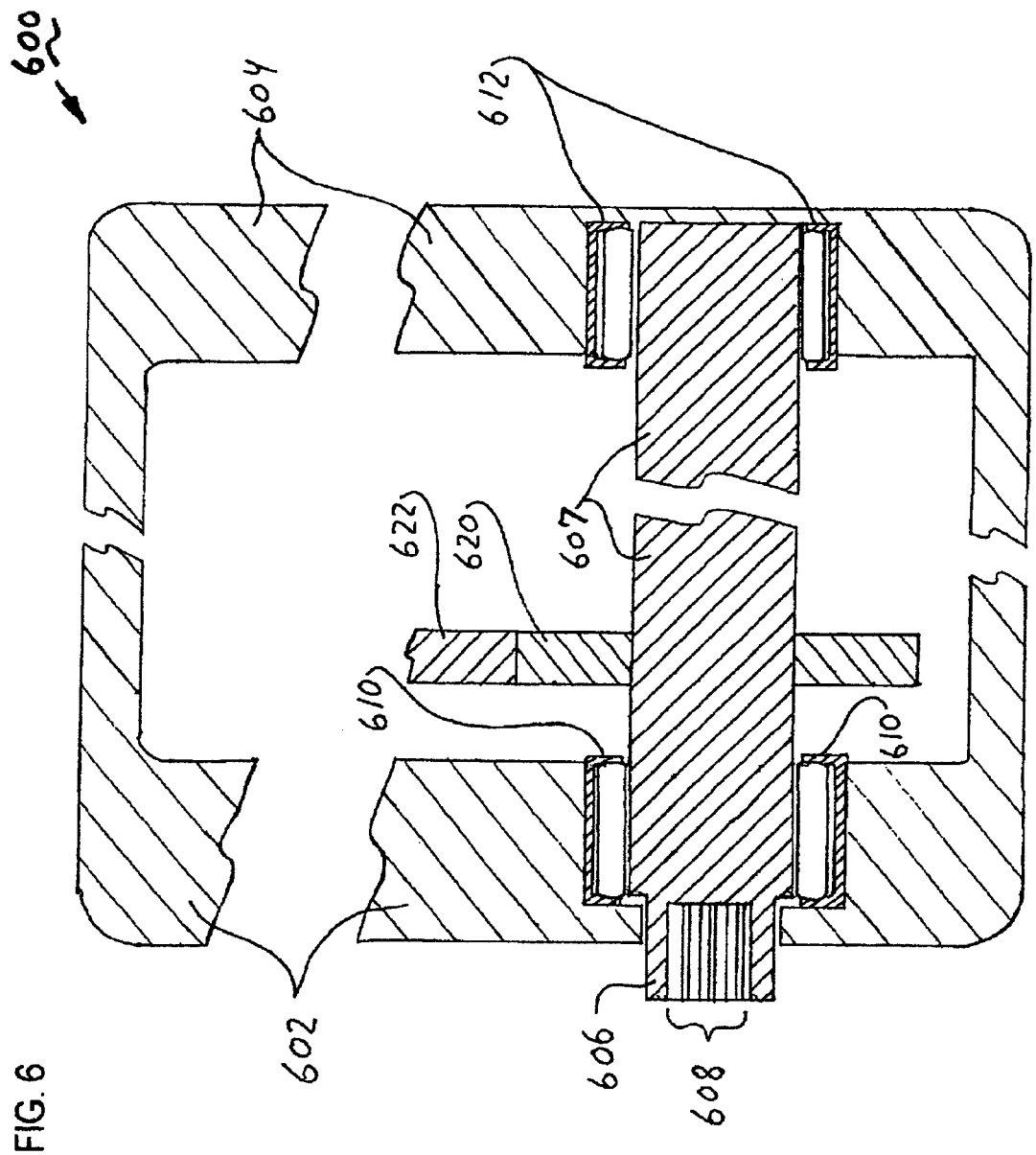
FIG. 6 illustrates another embodiment of a power takeoff for an all terrain vehicle.

FIG. 6 illustrates another embodiment of a power takeoff for an all terrain vehicle (ATV). With reference to FIG. 6, an ATV transmission is shown generally at 600. The transmission case has a left portion 602 and a right portion 604. Similar to FIG. 5, only the pertinent portion of the transmission and/or sub-transmission is shown in FIG. 6 to preserve clarity during the discussion. A transmission shaft 607 is adapted for coupling thereto as shown with splines 608. The transmission shaft can extend outside of the transmission case 602 (as indicated by end 606) or the transmission shaft can reside within the confines of the transmission case. The coupling surface 608 will allow power to be diverted from the ATV engine by way of the transmission shaft 602. The transmission shaft 607 is supported on the right side by a bearing 612 and the left side by a bearing 610. The transmission shaft 607 has a plurality (all are not shown) of gears mounted thereon such as a gear 620. The gear 620 meshes with a gear 622 to provide transmission functionality. Power is diverted to a power takeoff by coupling to the transmission shaft as previously described. The orientation of the rotating shaft can be redirected as needed for various devices that can be powered by the power takeoff.

Figure 7:
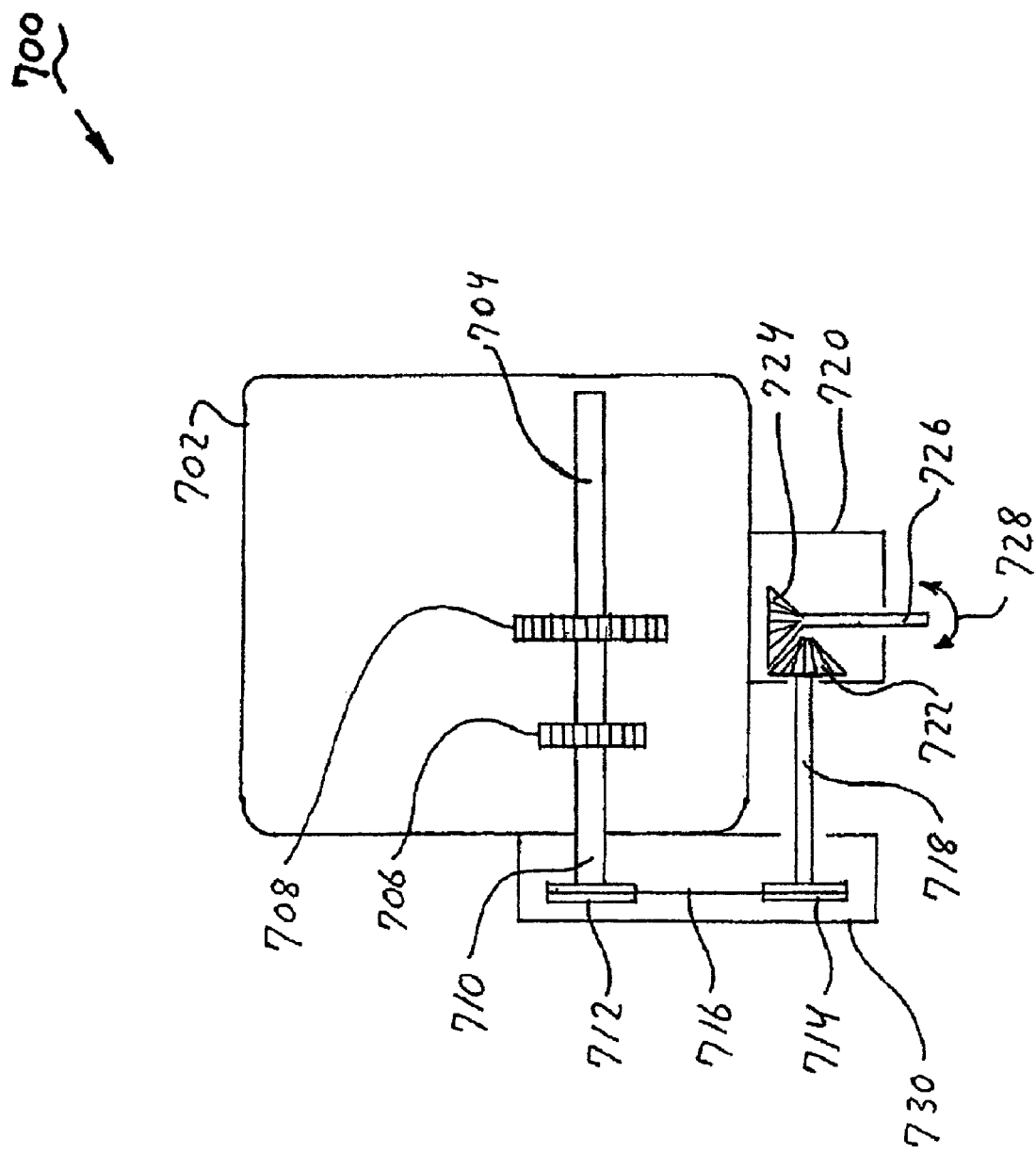
FIG. 7 shows a system to redirect a rotating shaft direction according to one embodiment of the invention.

FIG. 7 shows a system to redirect a rotating shaft direction according to one embodiment of the invention. With reference to FIG. 7, an ATV transmission is shown generally at 700. The transmission includes a case 702, a transmission shaft 704, with one or more gears indicated by 706 and 708. The transmission shaft is supported by a bearing (not shown) to allow rotation about a longitudinal axis. In the embodiment shown in FIG. 7, a portion of the transmission shaft 704 extends out of the transmission case 702 as indicated at 710. In the embodiment shown in the figure, power is redirected by means of a sheave system and bevel gears. It will be noted by those of ordinary skill in the art that other systems can be employed to redirect power, such as a flexible shaft, etc. In the embodiment shown, a first circular member 712 is coupled with a second circular member 714 utilizing an appropriate flexible power transfer device 716, enveloped by a housing 730. In one embodiment, circular member 712 and 714 can be sheaves and 716 can be a belt. In another embodiment, 712 and 714 can be sprockets and 716 can be a chain. Secondary shaft 718 is supported by bearings (not shown), and is driven at one end by circular member 714. In one embodiment, the secondary shaft 718 has a bevel gear attached as shown at 722, bevel gear 722 meshes with bevel gear 724 to rotate shaft 726 as shown by arrow 728. Bearings (not shown) support shaft 726 allowing the shaft to rotate about its axis. Housing 720 contains shaft 726, gears 722, 724, and the associated bearings and other components needed to provide a remote location at which power can be extracted from the engine of the ATV. Such a remote location is another configuration for a power takeoff according to one or more embodiments of the invention. A complete power takeoff unit can be configured to house the necessary power takeoff components and associated auxiliary power systems according to several embodiment of the invention. Such auxiliary systems can facilitate operation, via a power takeoff, of a hydraulic motor, and an electric motor. A power takeoff can be configured to run attachments such as water pumps, grass cutters, winches, etc. The sheaves 712 and 714 can provide increased or decreased rotational speeds of the secondary shaft 718 relative to the transmission shaft 704.

Figure 8:
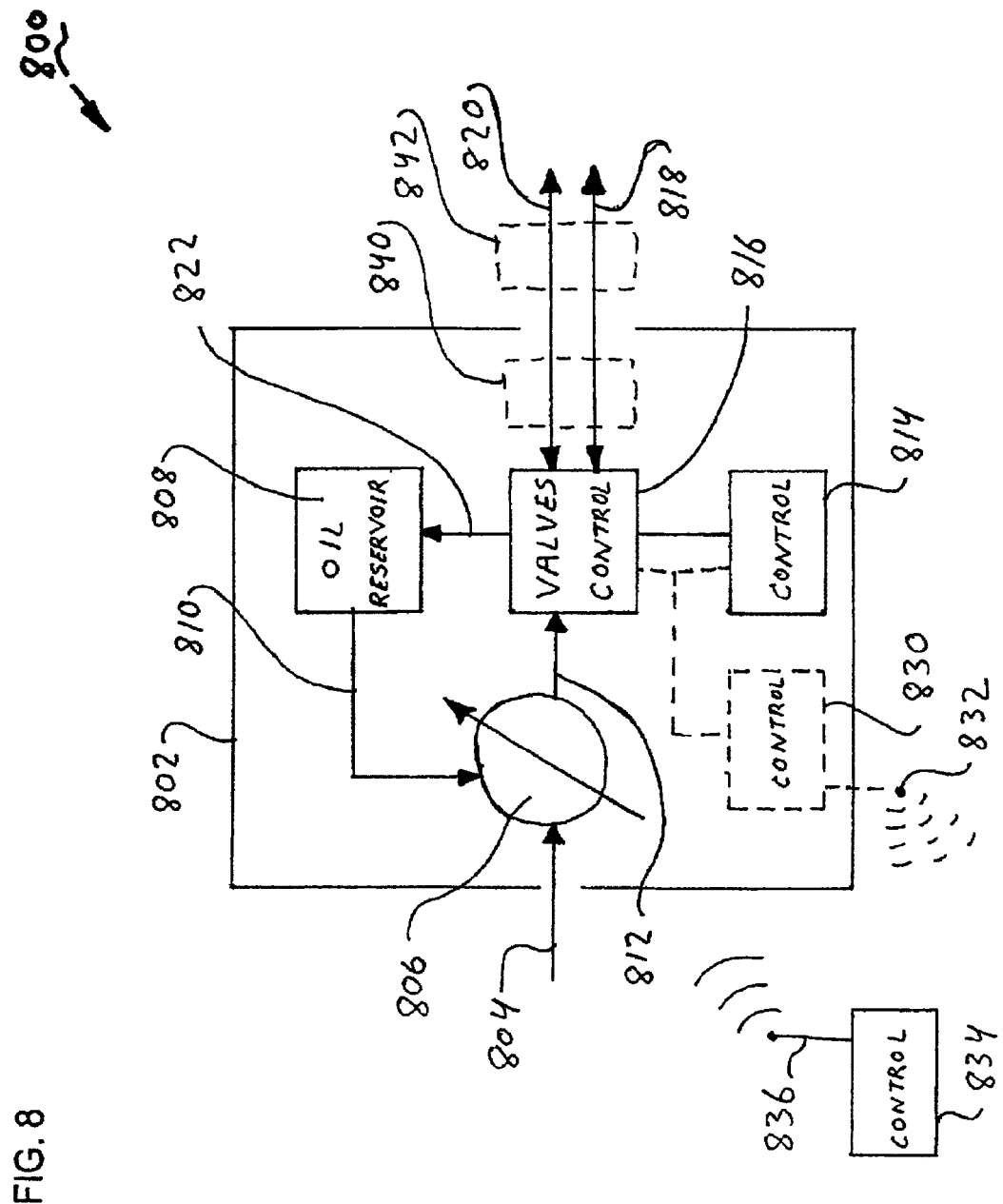
FIG. 8 illustrates a power takeoff package according to one embodiment of the invention.

FIG. 8 illustrates a power takeoff package according to one embodiment of the invention. With reference to FIG. 8, a power takeoff package is illustrated generally at 800. In one embodiment, the power takeoff package includes a housing 802. The housing 802 can be mounted in a convenient place on an ATV such as the back of ATV 100 (FIG. 1). Power can be supplied to the power takeoff package 800 at 804. Power supplied at 804 can be provided by means of a rotating shaft such as shaft 718 (FIG. 7) or another suitable connection to an ATV transmission. Power supplied at 804 can be input to a hydraulic pump 806 wherein the pressure of fluid entering the pump at 810 is increased across the pump at 812. High pressure hydraulic fluid is available at valve/control 816. Valve/control 816 can be an integrated valve with a means for control or it can exist as a valve that is controlled by control 814. A line 818 can serve as a high pressure output line and a line 820 can serve as a return line for the fluid. A load (not shown), such as a hydraulic motor, is connected to lines 818 and 820. Fluid at low pressure returns via path 822 to a reservoir 808. Reservoir 808 is connected via fluid path 810 to the hydraulic pump 806 thus completing the circuit of fluid flow.

Fluid can be cooled at 840 within the housing 802 or external to the housing at 842. Device 840 can include a heat exchanger that dissipates heat as fluid flows therein. A fan can supply a flow of air across the heat exchanger to increase the rate of cooling applied to the hydraulic fluid. Alternatively or in conjunction with cooling device 840 a cooling device 842 can be configured on an ATV external to housing 802 to provide cooling for the hydraulic fluid. Such a device can include a heat exchanger with a shroud that is configured to direct air across the heat exchanger as the vehicle is moving. An alternative embodiment can include a fan that provides a flow of cooling air across a heat exchanger while the vehicle is stationary. The heat exchanger can be configured to provide cooling for engine oil as well as hydraulic fluid. Such an arrangement can be beneficial when the power takeoff is running an apparatus that requires the ATV to be stationary since ATV engines are often air cooled.

The control 814 is in communication with valves/control 816 as previously described. Control 814 can be a mechanically operated valve that stops the flow of hydraulic fluid and the control can switch the line that functions as the high pressure line with the return line; thereby, reversing the direction of the hydraulic motor (not shown) attached to lines 818 and 820. Control 814 can be replaced or augmented by a wireless control 830. Wireless control 830 can be configured with antenna 832 to communicate wirelessly with remote control 834. Remote control 834 is equipped with antenna 836 and the pair is configured to provide wireless control of the hydraulic valves necessary to regulate the flow of hydraulic fluid to the hydraulic motor (not shown). Data from various sensors can be sent wirelessly to control 834, such as hydraulic fluid pressure, etc. Control 814 or 834 can also be configured with a control to regulate the speed of an ATV engine that provides power 804 to the power takeoff unit 800.

Figure 9:
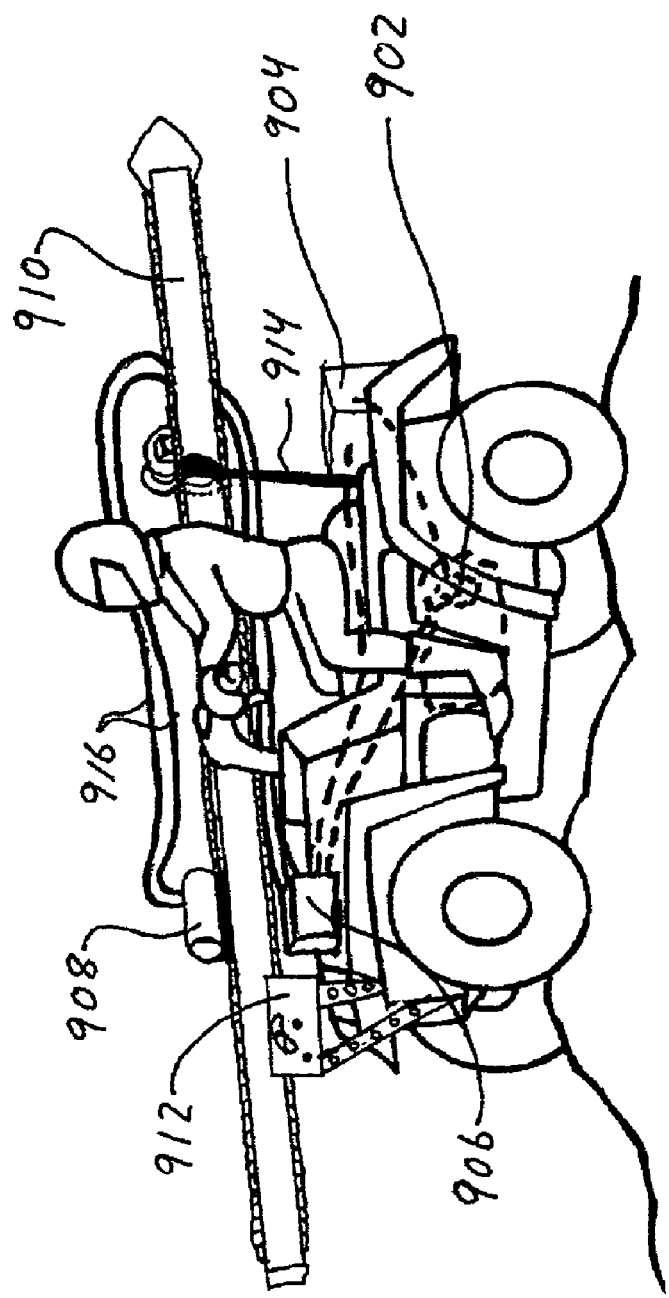
FIG. 9 illustrates a mobile drill according to one embodiment of the invention.

FIG. 9 illustrates a mobile drill according to one embodiment of the invention. With reference to FIG. 9 a mobile drill is shown generally at 900 configured on an all terrain vehicle (ATV). Mobile drill 900 includes an ATV having a transmission and/or sub-transmission configured with a power takeoff 902. Power takeoff 902 is used to divert power to operate a drill head (not shown) via drill motor 908. A drill mast 910 is movably coupled with the ATV at 912; the drill mast can rest in a cradle 914 during transit to the drill site. Movable couple 912 can provide rotation of the drill mast about two axes; thereby allowing the drill mast 910 to be plumbed without leveling the ATV as well as allowing the drill mast to be conveniently positioned for transit to the drill site. Rotation of the drill mast about one or more axes is referred to herein as a self-aligning mast. A self-aligning mast allows an operator to move the mobile drill to a drill site, align the mast vertically, and drill a hole in less time than it would take if the drill platform had to be leveled before drilling commenced. Additionally, increased drill platform stability is achieved by creating a self-aligning mast since mechanisms needed to level the drill platform are more problematic and prone to malfunction while drilling, especially on sloped ground. The self-aligning drill mast relies on the stability provided by the ATV in contact with the ground by means of the ATV tires and adjustable leg at the bottom of the drill mast. The adjustable leg at the bottom of the drill mast is described below in conjunction with FIG. 10.

In one embodiment, the power takeoff 902 can power a hydraulic pump (which can be coincident therewith as shown in FIG. 2), fluid flows along the path indicated by the dashed line to an oil reservoir 904. Hydraulic fluid flows from the oil reservoir 904 along a dashed line to a control 906. Hydraulic fluid flows from the control 906 via lines 916 to the drill motor 908. In one embodiment, the drill motor 908 can be a hydraulic motor. The power system for the drill can be configured in different embodiments as will be evident to those of ordinary skill in the art. The present invention is not limited by the way in which the drill is configured on the ATV or the power system used to power the drill motor from an ATV engine.

FIG. 10 shows a mobile drill powered by an all terrain vehicle (ATV) power takeoff according to one embodiment of the invention. With reference to FIG. 10, a mobile drill is shown generally at 1000. A coordinate system (X,Y,Z) is indicated within FIG. 10, wherein the XY plane represents a level surface and the Z axis is perpendicular thereto. The mobile drill is positioned on the ground 1004, which need not be level, since the drill mast can be self-aligned.

The mobile drill includes an ATV 1002 configured with a drill mast 1008, the drill mast 1008 is movably coupled to the ATV at 1010 for self-alignment. A drill motor 1012 is mounted on a carriage 1014. The carriage 1014 is slidingly disposed on the drill mast 1008. The carriage 1014 is coupled to a flexible member 1016, such as a chain. Flexible member 1016 travels over sheave 1018 and is received by a winch 1020. The winch 1020 is used to regulate a height of the drill motor 1012 relative to the ground 1004 as the hole 1006 is being drilled as well as after the hole has been drilled. The winch 1020 is used to retract the drill bit and associated parts that end up down-hole after drilling. The winch 1020 can be hydraulically operated in one or more embodiments or it can be manually operated in other embodiments.

An adjustable leg 1051 provides contact with the ground and can include a contact pad 1052. The adjustable leg can be manually operated utilizing a threaded rod or the adjustable leg can be power assisted. One method of providing power assist is to employ a hydraulic line 1050 coupled with a hydraulic cylinder at 1051 to press the contact pad 1052 into contact with the ground 1004, providing stability to the drill mast. The adjustable foot assists during removal of the drill from the hole during retraction by providing vertical rigidity to the system.

In one embodiment, an ATV transmission or sub-transmission at 1022 is equipped with a power takeoff 1024. In one embodiment, wherein a hydraulic motor is used as the drill motor 1012, the power takeoff 1024 is coupled with fluid reservoir 1028 by lines 1026, and with a control 1032, by lines 1030. Hydraulic fluid at high pressure is supplied via line 1036 to the drill motor 1012. A low pressure hydraulic return line is not shown in order to keep the figure uncluttered. A reverse direction can be achieved within the hydraulic motor by reversing a direction of fluid flow through the motor with dual lines or a control valve can be incorporated into the hydraulic motor 1012 to provide a reverse function.

The control 1032 can embody the functionality described in conjunction with FIG. 8, controlling the drill motor thereby. A remote control device 1040 can be used in conjunction with control 1032 to provide wireless control of the drill operations and control of a speed of an ATV engine. Since the drill motor is powered by diverting power from the ATV engine (utilizing the power takeoff) it can become necessary to regulate the speed of the ATV engine during drilling. The speed of the ATV engine can be controlled by an ATV throttle 1034. In such an embodiment; it can be advantageous to mount the control 1032 on the opposite side of the ATV, proximate with the throttle 1034. In another embodiment, the ATV engine speed can be maintained with a governor; thereby, maintaining a continuous ATV engine speed. The methods of control taught herein can be used in combination and are not mutually exclusive. For example, a wireless control can be configured along with a governor to maintain constant ATV engine speed.

In another embodiment, a power takeoff package (similar to the description accompanying FIG. 8) can be provided at 1028, which would include an integration of controls, hydraulic fluid reservoir, etc. The hydraulic pump could also be combined therein as described in conjunction with FIG. 7.

In one embodiment, the drill mast is constructed from a three inch square steel tube with a wall thickness of 0.120 inch. In one embodiment, the length of the drill mast is seven feet four inches. In one embodiment, when the drill mast is mounted on an Artic Cat 250 or 300 ATV or a Suzuki LT-F4WDX, LT-F4WD (e.g., 250, 300 & King Quad) ATV the top of the drill mast is eight feet two inches above the surface of the ground 1004.

Many different types of drilling can be performed with the mobile drill according to various embodiments of the invention. For example, the mobile drill can be used for rock coring, mud rotary drilling, solid stem auger drilling, hollow stem auger drilling, including standard penetration test (SPT) driven impact sampling, etc.

In one embodiment, directed to hollow stem auger drilling, drill sections that are two and one half feet in length are used. In one or more embodiments, the drill is a hollow auger design. A hollow auger drill bit head is a design that typically has four teeth disposed around the perimeter. Two of the teeth point toward the interior of the hollow auger and two teeth point toward the exterior of the hollow auger. Configured as described above, the mobile drill is capable of drilling to and taking standard penetration test (SPT) samples at depths of thirty to thirty five feet in dense soils and fifty to sixty feet in softer soils. In one embodiment the hydraulic pump powered by the power takeoff generates 3,000 pounds per square inch of pressure with a volume flow of 9.8 gallons per minute. SPT samples will be described in conjunction with FIG. 13. The low weight of an ATV provides a mobile drill that is light enough to pass over a seeded lawn without inflicting damage thereto, while still having sufficient power to drill to the desired depths.

A sheave 1042 is rotateably coupled with a motor 1044. The sheave 1042 is used to raise an impact hammer which can be used to drive a SPT sample tube into the ground as will be described in conjunction with FIG. 13. In one embodiment, the motor 1044 can be a hydraulic motor that is also controlled with control 1032 and/or control 1039. The motor 1044 can be supplied with hydraulic fluid via lines 1040. The ground 1004 need not exist as a flat plane. The drill contains the capability of self-aligning the mast with vertical by providing rotation about at least one axis.

Figure 11A:
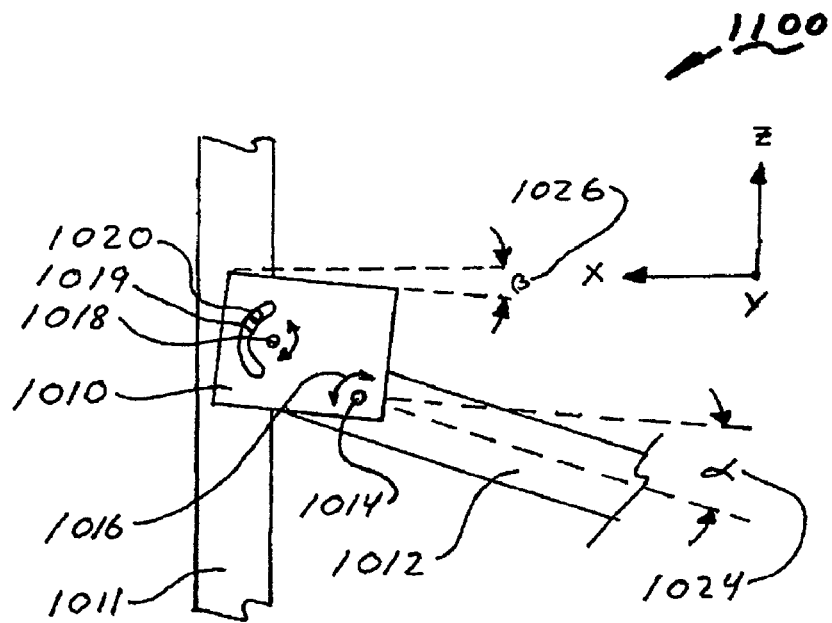
FIG. 11A illustrates rotation of a drill mast about a Y axis according to one embodiment of the invention.

FIG. 11A illustrates rotation of a drill mast about a Y axis according to one embodiment of the invention. In this example, the Y axis has been arbitrarily chosen to be parallel with an axis passing through an ATV axel. With reference to FIG. 11A, a drill mast 1011 is rotateably coupled with a plate 1010. The drill mast 1011 pivots about a Y axis at point 1018. In one embodiment, a channel is provided at 1019 and a lock mechanism is indicated at 1020. A lock mechanism includes a threaded bolt and nut that can be tightened; thereby, fixing the angle β indicated at 1026. In one embodiment, the drill mast 1011 can rotate approximately 110 degrees relative to plate 1010 about point 1018. Another range of adjustment about the Y axis is provided by the rotation of plate 1010 about point 1014, making an angle α indicated at 1024. In one embodiment, plate 1010 can rotate approximately ninety degrees relative to ATV frame 1012 about point 1014. Rotation of plate 1010 relative to the ATV frame 1012 on axis 1014 allows the drill mast to be aligned even though the ATV may be placed on uneven ground.

Figure 11B:
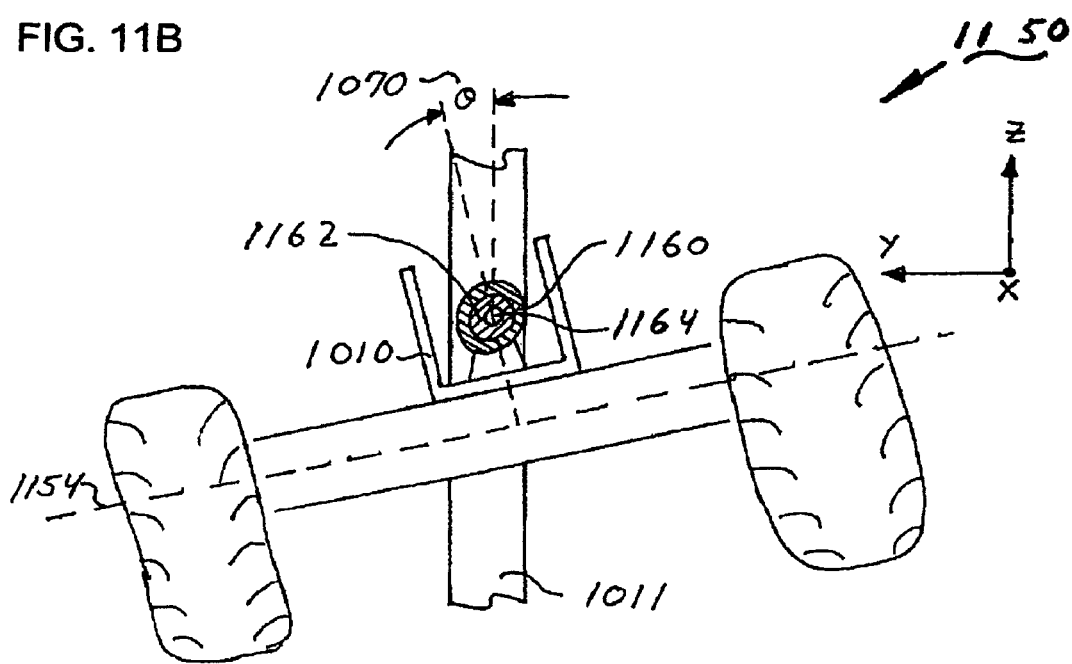
FIG. 11B illustrates rotation of a drill mast about an X axis according to one embodiment of the invention.

FIG. 11B illustrates rotation of a drill mast about an X axis according to one embodiment of the invention. In this example the X axis has been arbitrarily chosen to be parallel with a longitudinal axis of an ATV. With reference to FIG. 11B, rotation of the drill mast about the X axis is shown generally at 1150. A drill mast 1011 is shown rotated at angle θ, indicated at 1070, (wherein the angle θ, indicated at 1070, has been arbitrarily referenced from a perpendicular to an axis 1154) in order to align the drill mast with the vertical Z axis. In one embodiment, rotation about the X axis is accomplished with a mechanism consisting of two concentric cylinders. An inner cylinder 1162 can be fixedly attached to the drill mast 1011. A second cylinder 1160 can be fixedly attached to bracket 1010. A locking mechanism can be employed to fix the rotation of 1162 relative to 1160; thereby, fixing angle 1070. Various locking mechanism can be configured to fix the rotation of 1162 relative to 1160, such as bolt and nut clamp mechanisms. Gears can be provided to facilitate adjustment of the angle at 1070 by allowing precise rotation of the drill mast 1011 about axis 1164.

In one embodiment, the drill mast can be rotated to point sideways or in an upward direction in order to drill holes that are not vertically orientated. No limitation is placed on the orientation of the drill mast or the way in which the self-alignment is accomplished. For example, structures other than those shown in the figures can be employed to articulate the drill mast. In one embodiment, the axial pivots shown in the figures can be replaced with a ball and socket clamp. In one embodiment, the drill mast is attached to the "ball" and the "socket" is fastened to the drill platform. In one embodiment, the socket is configured with a clamp, such that when the clamp is loosened the drill mast can be articulated. When the desired position of the drill mast is achieved the clamp is secured; thereby, fixing the orientation of the drill mast. Other structures can be created to provide an articulated drill mast and are all within the intended scope of embodiments of the invention.

In one or more embodiments, the drill mast can be released from the all terrain vehicle (ATV) while still receiving power from the ATV. Some examples are shown in FIG.14A, FIG. 14B, and FIG. 14C. When the drill mast is separated from the ATV, the drill mast can be supported by a drill mast stand, such as, but not limited to, a tripod, a frame, etc. The drill can then be used to drill holes as previously described, employing various drilling methods, such as but not limited to rock coring, mud rotary drilling, solid stem auger drilling, hollow stem auger drilling, etc. Separated from the ATV, the drill mast can be maneuvered into places that the ATV could not easily go or go at all, such as a basement of a building. If the space is confined, the drilling can proceed without the exhaust from the ATV being proximate to the operator during the drilling operation.

Figure 12:
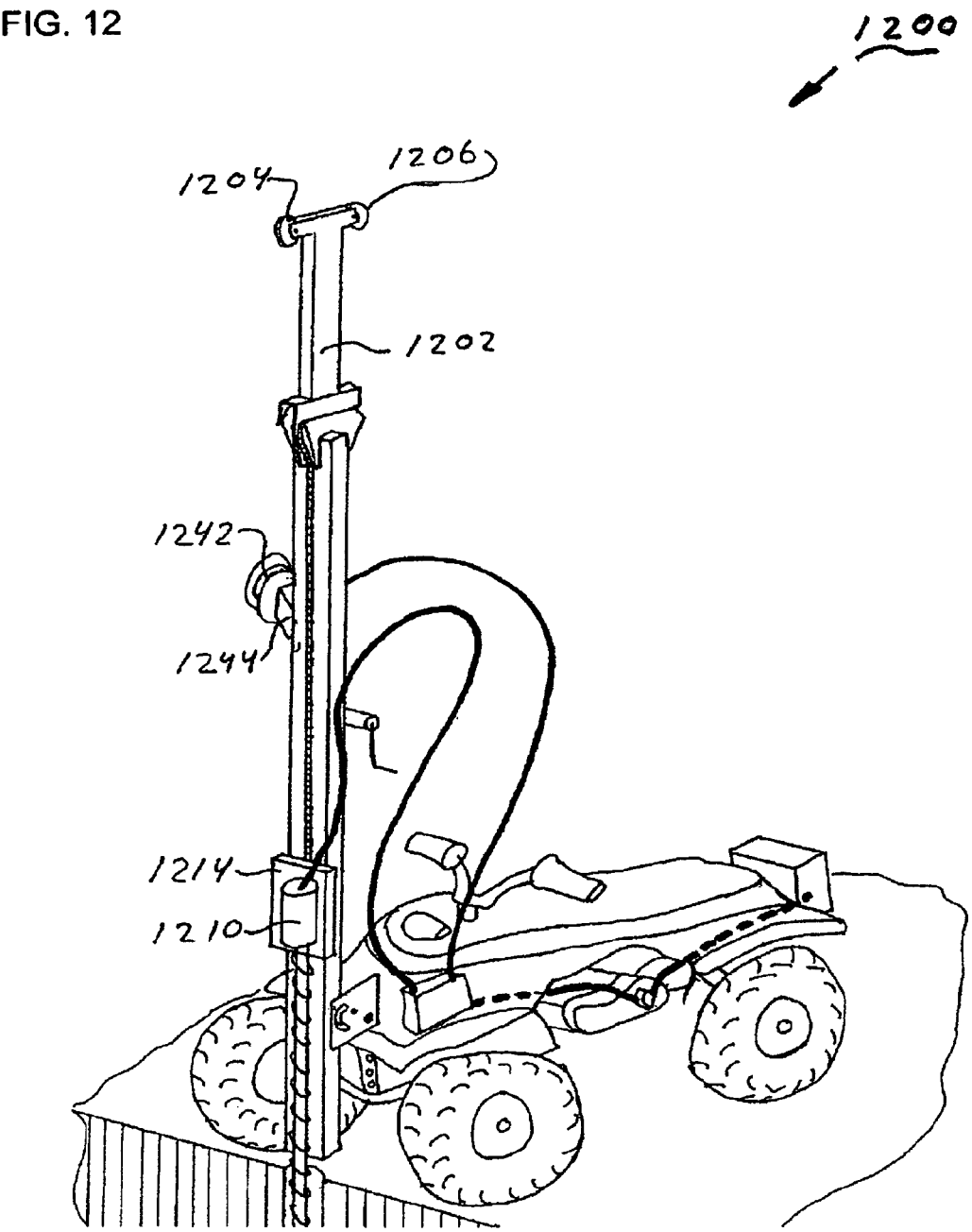
FIG. 12 shows a mast extension according to one embodiment of the invention.
Figure 13:
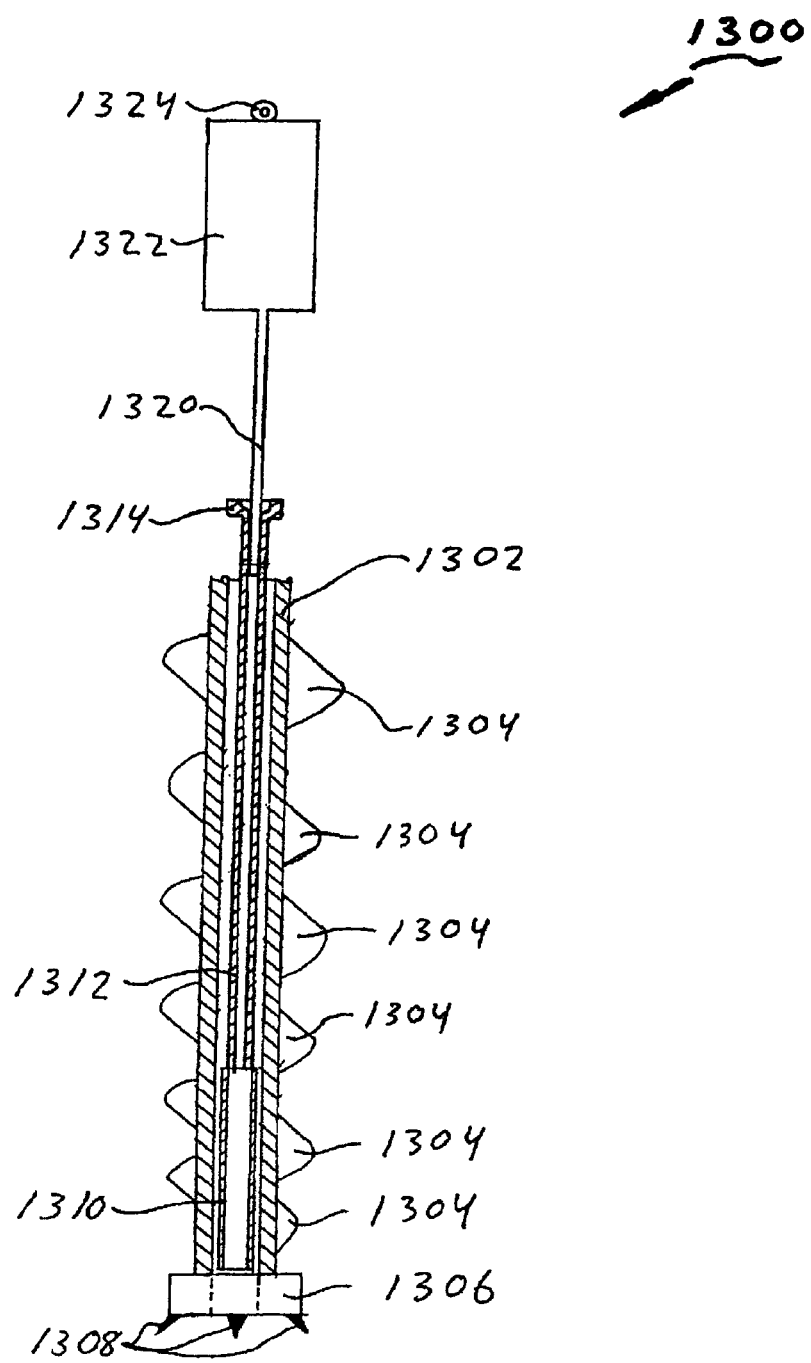
FIG. 13 illustrates driving an impact hammer according to one embodiment of the invention.

FIG. 12 shows a mast extension according to one embodiment of the invention. With reference to FIG. 12, a mobile drill is shown generally at 1200. A drill motor 1210 is mounted on a carriage 1214. The carriage 1214 is slidingly disposed on a drill mast. A drill mast extension 1202 is mounted at the top of the drill mast. The drill mast extension has a forward sheave 1204 and a rear sheave 1206. The drill mast extension and the sheaves 1204 and 1206 are used in conjunction with a winch to lift an impact hammer 1322 from point 1324 (FIG. 13) above the top of the drill bit 1302 (FIG. 13). With reference back to FIG. 12, in one embodiment, a winch used to lift the impact hammer includes a motor 1244 and a sheave 1242. In one embodiment, the motor can be a hydraulic motor powered by a power takeoff that obtains power from an ATV engine. A flexible cord, such as a rope or similar member (not shown) is attached to point 1324 (FIG. 13) and passes up over the first sheave 1204 across the rear sheave 1206 and is received on sheave 1242, wherein several wraps are made around the sheave 1242. The motor 1244 is engaged and the rope is wrapped onto the sheave 1242 raising the impact hammer thereby (1322 FIG. 13). In one embodiment, a hemp rope having a 0.75 inch outer diameter is used.

FIG. 13 illustrates driving an impact hammer according to one embodiment of the invention during standard penetration test (SPT) sampling. With reference to FIG. 13, when the hole has been drilled to the desired depth by a drill bit 1302 having flutes 1304, drill bit head 1306, and drill teeth 1308, the carriage 1214 (FIG. 12) can pivot off to the side; thereby, allowing an impact hammer 1322 to drop down and contact a sample tube extension member 1312, at an end 1314, when the rope is released from sheave 1242 (FIG. 12). The sample tube extension member is fastened to a sample tube 1310. The blow imparted from the impact hammer to the sample tube extension member 1320 drives the sample tube into the soil beneath the bottom of the hole drilled by the drill bit 1302. In response to the blow imparted from the impact hammer, the sample tube 1310 passed through a hole in the drill bit head 1306, indicated by dashed lines, thus filling the sample tube with a core sample of soil for analysis according to the SPT. The sample tube can be extracted from the hole by retracting the sample tube extension member with the drill motor 1012, carriage 1014 and winch 1020 (FIG. 10). In a similar fashion, the drill can be retracted from the hole while operating the drill in reverse direction; thereby, facilitating removal of the drill sections. As the drill is withdrawn from the hole, sections of the drill are removed and a length of drill remaining in the hole becomes shorter and shorter until the last piece is removed.

A technique for minimizing the time required to take SPT samples while drilling a hole involves leaving the sample tube 1310 in the position shown in FIG. 13 while drilling the hole. Such a technique, minimizes the time required to take SPT samples since time is not wasted removing the sample tube and associated sample tube extension members unnecessarily.

The previous figures have been used to describe a mobile drill, wherein the drill motor is powered by a power takeoff that diverts power from an ATV engine. Other devices can be powered from the ATV power takeoff. These devices include, but are not limited to, a winch for lifting and loading game for transit. A water pump, a saw rig for cutting wood, a bush hog for cutting grass and brush, a soil tiller for plowing soil, etc.

As used in this description, "one embodiment," "one or more embodiments," "an embodiment" or similar phrases mean that feature(s) being described are included in at least one embodiment of the invention. References to "one embodiment" or any reference to an embodiment in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus methods and apparatuses for creating a power takeoff on an all terrain vehicle have been described. Devices that draw power from the power takeoff have been described, such as, but not limited to, a mobile drill.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for adapting an existing all terrain vehicle (ATV) transmission, comprising:
   providing a hole through a stock transmission case, wherein the hole is aligned with a stock transmission shaft;
   lengthening the stock transmission shaft to make a modified transmission shaft, wherein an end of the modified transmission shaft is coupleable thereto and can be accessed from the hole; and
   modifying a stock sub-transmission shift plate to have a first neutral position between an existing high gear position and an existing low gear position, wherein power is transferred to the modified transmission shaft and not to the ATV's wheels when the modified sub-transmission shift plate is placed in the first neutral position, and power is transferred from the ATV's engine to the modified transmission shaft without a belt.

2. The method of claim 1, wherein the power takeoff point further includes a flange.

3. The method of claim 1, further comprising:
   modifying the stock sub-transmission shift plate to provide a second neutral position between an existing low gear position and an existing super-low gear position, wherein power is delivered to the modified transmission shaft, and not to the ATV's wheels, when the modified sub-transmission shift plate is placed in the second neutral position.

* * * * *